(12) United States Patent
Yoneda et al.

(10) Patent No.: US 6,343,244 B1
(45) Date of Patent: Jan. 29, 2002

(54) AUTOMATIC GUIDANCE SYSTEM FOR FLIGHT VEHICLE HAVING PARAFOIL AND NAVIGATION GUIDANCE APPARATUS FOR THE SYSTEM

(75) Inventors: Hiroshi Yoneda; Atsushi Amito, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/444,834

(22) Filed: Nov. 22, 1999

(30) Foreign Application Priority Data

Nov. 24, 1998 (JP) .......................................... 10-332672

(51) Int. Cl.⁷ .............................................. G06F 17/00
(52) U.S. Cl. ............................ 701/3; 701/207; 701/213
(58) Field of Search ............................. 701/1, 3, 5, 200, 701/207, 213

(56) References Cited

FOREIGN PATENT DOCUMENTS

| DE | 43 06 623 A1 | 8/1993 |
| DE | 43 39 25 A1 | 4/1995 |
| DE | 43 36 056 A1 | 4/1995 |
| JP | 5-185993 | 7/1993 |

OTHER PUBLICATIONS

Partial English Translation of JP 5–185993 reference, (pars. 8 to 17), 6/96.
Patent Abstract of Japan vol. 1996, No. 10, Oct. 31, 1996 for JP 08 156893 (Mitsubishi Precision Co., Ltd.).

*Primary Examiner*—William A. Cuchlinski, Jr.
*Assistant Examiner*—Edward Pipala
(74) *Attorney, Agent, or Firm*—Smith, Gambrell & Russell LLP

(57) ABSTRACT

An automatic guidance system guides a flight vehicle having a para foil to a target grounding point. The system opens the para foil of the flight vehicle dropped in a predetermined area above the target grounding point. The system estimates wind velocity and wind direction after the para foil of the flight vehicle is opened. Then, the system determines the landing flight path of the flight vehicle based on the estimated wind velocity and wind direction, guides the flight of the flight vehicle to the determined landing flight path and descends the flight vehicle according to the landing flight path.

17 Claims, 11 Drawing Sheets

AUTOMATIC GUIDANCE SYSTEM FOR FLIGHT VEHICLE HAVING PARAFOIL AND NAVIGATION GUIDANCE APPARATUS FOR THE SYSTEM

BACKGROUND OF THE INVENTION

1. Field of the Invention

This invention relates to an automatic guidance system for a flight vehicle having a parafoil and a navigation guidance apparatus for the system.

2. Description of the Related Art

Dropping of cargoes, weather observation, recovery of unmanned flight vehicles and spacecraft using parachutes such as ram-air parachutes, parafoils and the like, have often been made because they can be made on even the unlevelled ground other than runways.

However, dropping and recovery of cargoes by means of flight vehicles having parafoils tend to be affected by wind and as the actual descent position may be deviated from a target descent position, the flight vehicle has been guided in the direction of correcting the deviation by steering the para foil.

JP-A 5-185993, for example, describes such a guidance apparatus as the related art for guiding purposes.

The guidance apparatus as disclosed in JP-A 5-185993 is, as shown in a block diagram of FIG. 14, used to judge the present traveling direction of a gliding flight vehicle using a controller 103 from the three-dimensional positions (X, Y and Z) of the flight vehicle detected by a GPS 101 and the horizontal directions (Bx and By) thereof detected by a geomagnetic sensor 102. Then a drive signal (±V) is sent to a DC motor 104 in answer to the deviation of its traveling direction from the direction of a preset target descent position whereby to make the flight vehicle turn so that the traveling direction may conform to the direction of the target descent position by operating the left or right control line 105 of a para foil corresponding to the direction of correcting the deviation.

In this guidance apparatus, position and attitude detections are respectively made by the GPS 101 and the geomagnetic sensor 102 at all times even when a flight vehicle P receives lateral wind W while the flight vehicle having a parafoil is traveling toward a target descent position O. Thus, the guidance apparatus keeps controlling the flight vehicle so as to direct its traveling direction toward the target descent position as shown by an arrow E by quickly correcting its attitude and course even though the flight vehicle is on the course of receiving the lateral wind as shown by a solid line in FIG. 15.

According to JP-A 5-185993, the course of the flight vehicle can be corrected by correcting its position and attitude at all times and even when the influence of the wind is exerted upon the flight vehicle, its attitude can be corrected quickly.

Since the guidance is given in only correcting the traveling direction to the direction of the target descent position, there is fear that accuracy of descent will be lowered considerably under the influence of moderate gale. Accordingly, the selection of a flight path is important because such a flight vehicle as is equipped with a para foil is unable to recover its altitude.

SUMMARY OF THE INVENTION

The present invention is intended to obviate the aforesaid problem of the related art and it is object of the present to provide an automatic guidance system for a flight vehicle having a parafoil and a navigation guidance apparatus for the system designed to secure a proper flight path and make greater accuracy of descent available.

In order to accomplish the object above, the invention of an automatic guidance system for a flight vehicle having a parafoil is such that the system for guiding the flight vehicle having the parafoil to a target grounding point, the system comprises the steps of: opening the parafoil of the flight vehicle dropped in a predetermined area above a grounding target point; estimating wind velocity and wind direction after the parafoil of the flight vehicle is opened; determining the landing flight path of the flight vehicle based on the estimated wind velocity and wind direction; guiding the flight of the flight vehicle to the determined landing flight path; and making the flight vehicle descend according to the landing flight path.

Further, the invention of a navigation guidance apparatus for a flight vehicle having a parafoil is such that the apparatus for guiding the flight vehicle having the parafoil to a target grounding point, the apparatus comprises wind-velocity and wind-direction estimating means for estimating wind velocity and wind direction after the parafoil of the flight vehicle is opened; land flight path determining means for determining the landing flight path of the flight vehicle based on the wind velocity and wind direction estimated by the wind-velocity and wind-direction estimating means; and flight control means for controlling the parafoil so that the flight vehicle descends according to a landing flight path determined by the flight path determining means.

DETAILED DESCRIPTION OF THE PREFERRED EMBODIMENT

A detailed description will be given of an embodiment of the present invention with reference to the attached drawings.

In FIGS. 1–13, there are shown an automatic guidance system for a flight vehicle having a parafoil and a navigation guidance apparatus for the system.

Figure 1:
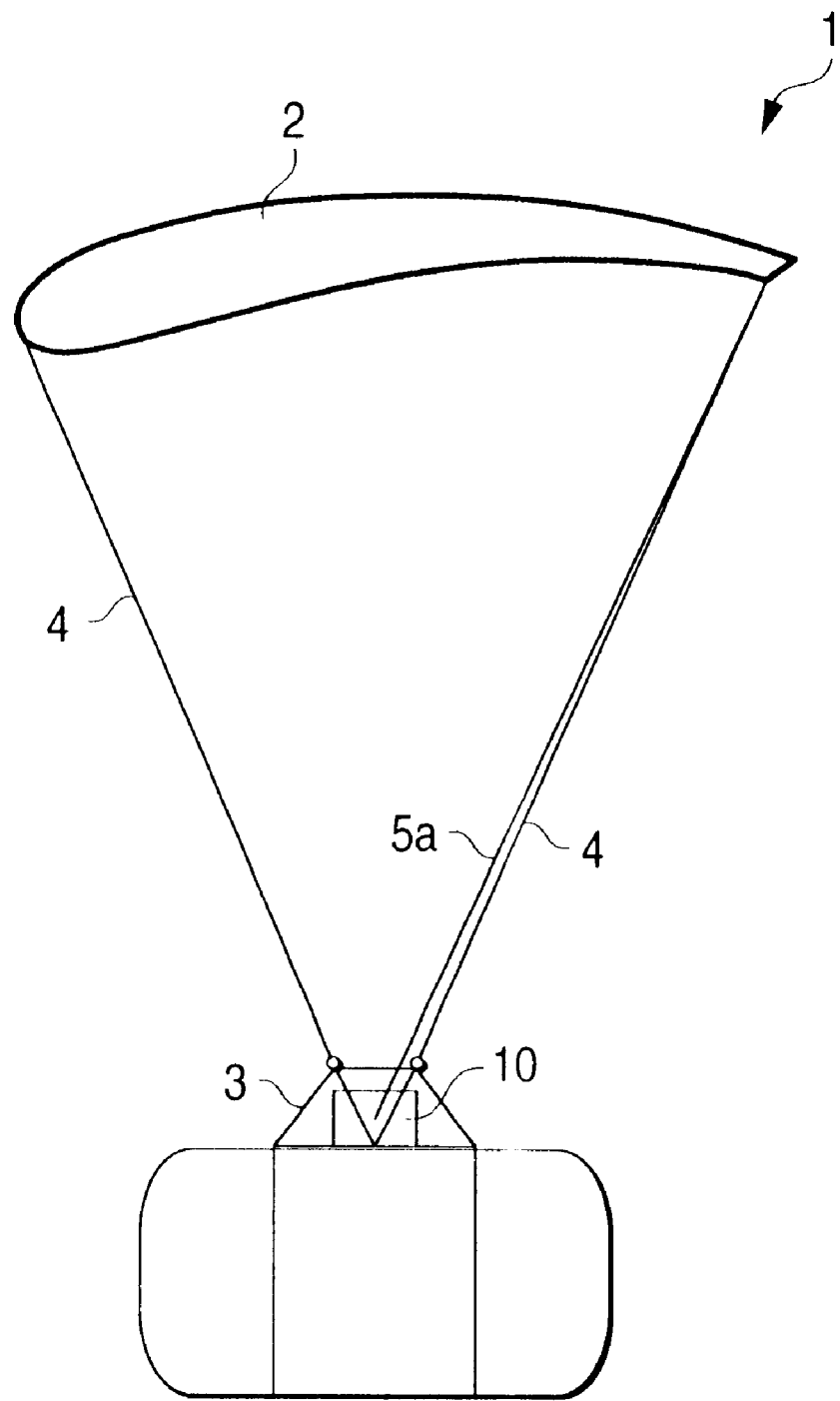
FIG. 1 is a schematic diagram illustrating a flight vehicle having a parafoil.

As shown in FIG. 1, a flight vehicle (hereinafter called the 'airframe') 1 having a parafoil includes, for example, a wing-like parafoil 2, a payload carrying frame 3 that is loaded with main equipment, a number of suspension lines 4, and a left and a right control line 5a and 5b (showing only one of them). The payload carrying frame 3 is suspended by the parafoil 2 via many suspension lines 4 in flight, and the lengths of tugging the control lines 5a and 5b are adjusted by a navigation guidance control unit 10 mounted in the upper portion of the payload carrying frame 3, so that the traveling direction is controlled.

Figure 2:
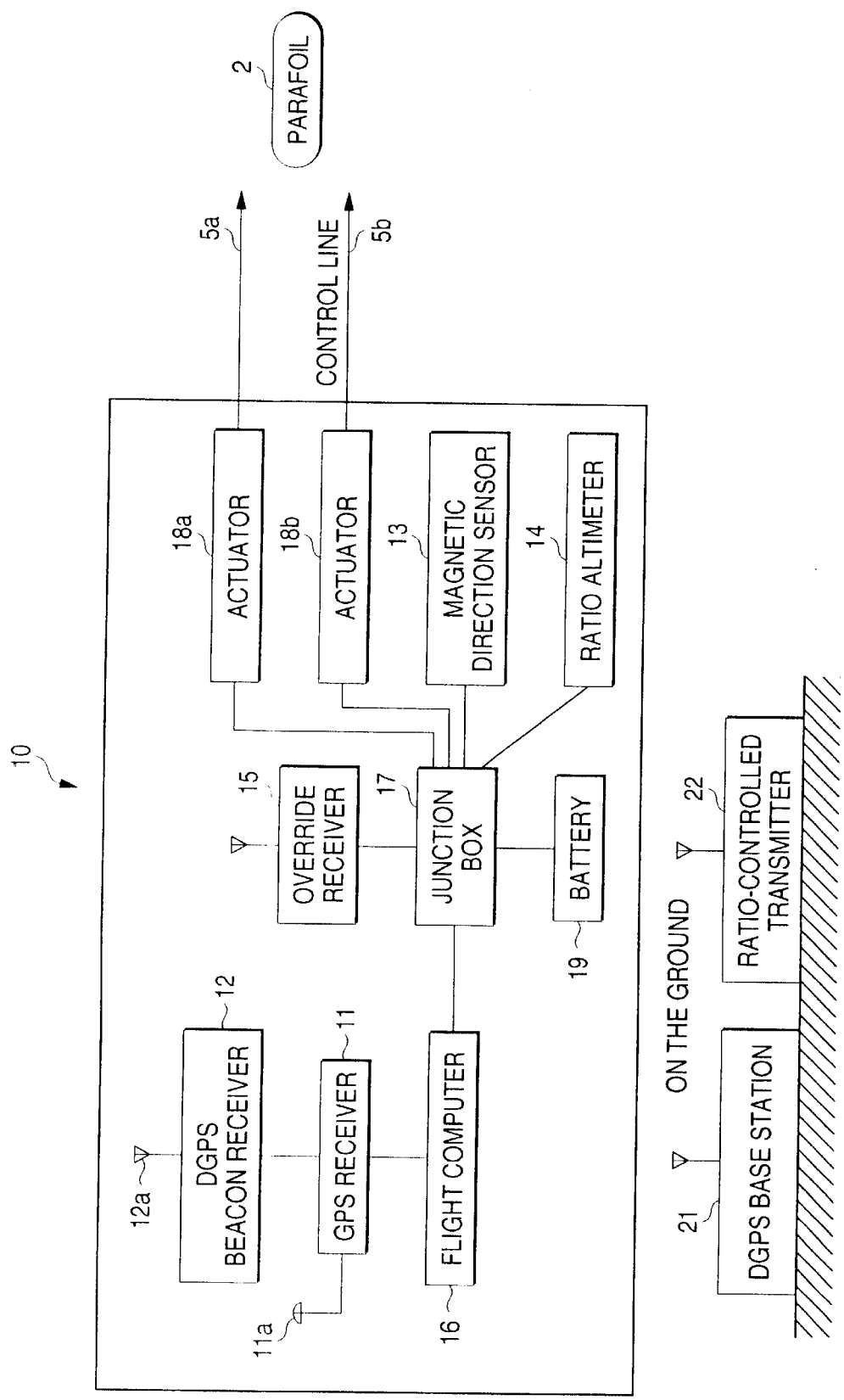
FIG. 2 is a block diagram illustrating a navigation guidance apparatus.

The navigation guidance control unit 10 includes, as shown in FIG. 2, a GPS receiver 11, a DGPS beacon receiver 12, a magnetic direction sensor 13, a radio altimeter 14, an override receiver 15, a flight computer 16, a junction box 17, actuators 18a and 18b for DC motors and the like, and a battery 19. Antennas 11a and 12a are provided for the GPS receiver 11 and the DGPS beacon receiver 12, respectively.

Apart from the navigation guidance control unit 10 mounted in the airframe 1, a DGPS base station 21 and a radio-controlled transmitter 22 are installed on the ground.

The GPS receiver 11 together with the DGPS beacon receiver 12 functions as a DGPS for providing the ground speed and present position of the airframe 1 in real time.

In the absence of the DGPS base station 21, the GPS is usable alone. The magnetic direction sensor 13 is used to detect the azimuth of the airframe, and the radio altimeter 14 to detect the altitude thereof. These pieces of information are input to the flight computer 16 and utilized as means for estimating the wind velocity and wind direction. The flight computer 16 during automatic flight functions as a means for determining a flight path including speed, altitude, flight direction and the like to be followed on the basis of the information thus acquired.

The flight computer 16 supplies control instructions to the actuators 18a and 18b and functions as a flight control means for adjusting the flight azimuth of the airframe 1 by adjusting lengths of tugging the left and right control lines 5a and 5b to turn the parafoil 2. With the control instruction to simultaneously tug the left and right control lines 5a and 5b, the flight computer 16 also operates to adjust a flight-path slope including forward airspeed, descent velocity and the like.

Under instructions from the radio-controlled transmitter 22 operated by a radio controller on the ground, for example, the override receiver 15 is used to give detailed guidance at the time of emergency or landing. While this override function is actuated, the instructions about operating the actuators 18a and 18b and controlling the airframe 1 are issued from the radio-controlled transmitter 22 and priority is given over the instructions of the navigation guidance control unit 10 mounted in the airframe 1.

On the basis of the state quantity of the airframe 1 outputted from the DGPS, the magnetic direction sensor 13 and the like, a flight maneuver to be taken now is determined by the flight computer 16 so that the airframe may land at a target grounding point when the altitude becomes zero and control instructions are output to the actuators 18a and 18b in order to realize the maneuver.

At the time of landing, there are important factors of a guidance law of securing performance of implementing automatic fixed point landing under any condition ranging from no-wind to moderate gale exceeding the forward airspeed, the factors including wind estimation, the effect of wind and altitude processing.

A description will subsequently be given of the aforementioned estimation of wind, consideration of the wind effect and altitude adjustment in sequence.

(Wind Estimation)

In order to guide the airframe 1 in consideration of the wind effect, it is needed to obtain values of wind velocity and wind direction as accurate as possible in real time. Referring to FIGS. 3 and 4, there will be given the description of a wind estimating method 1 by means of the DGPS or GPS alone as an example of the wind estimating method.

Figure 3A:
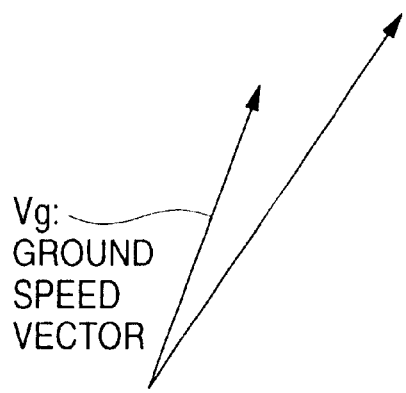
FIGS. 3A and 3B are a diagram illustrating a wind estimating method.
Figure 3B:
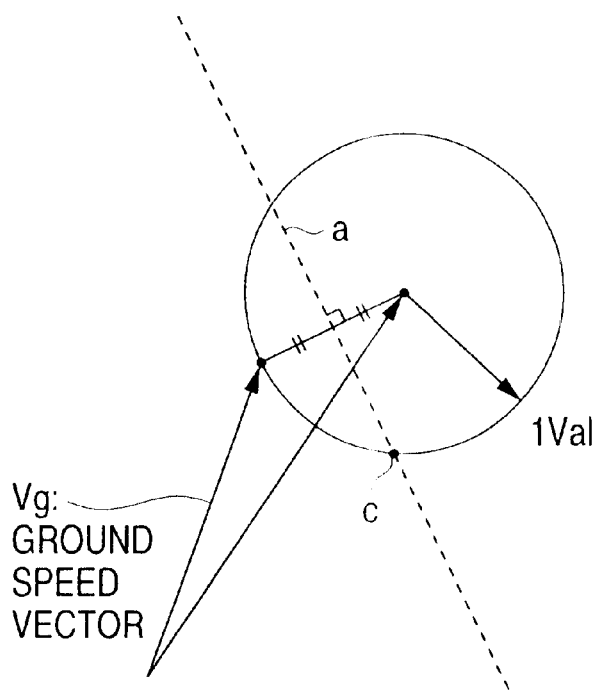
Figure 4:
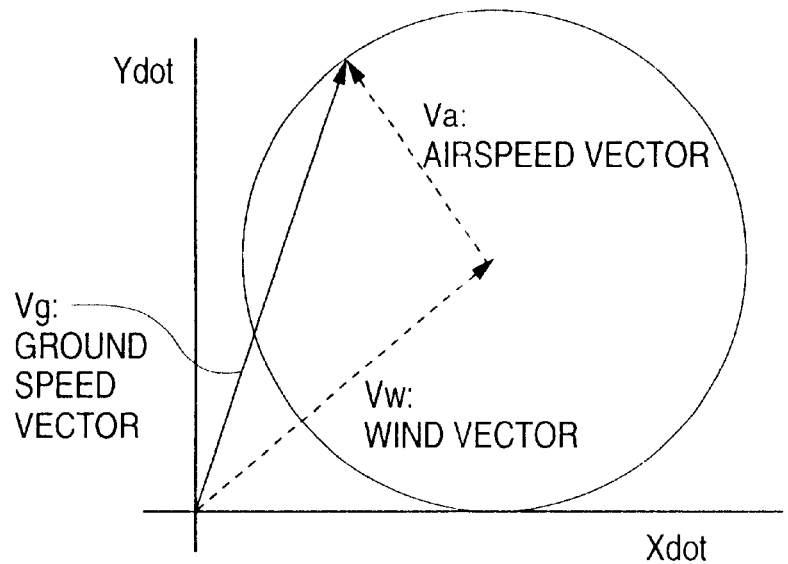
FIG. 4 is a diagram illustrating a wind estimating method.

The flight computer 16 is used to obtain two ground speed vectors Vg as shown in FIG. 3A on the basis of information from the override receiver 15, the DGPS beacon receiver 12, the DGPS base station 21 or GPS receiver 11 alone by making the airframe 1 do a steady turn. Then an intersecting point c between the vertical bisector a of a straight line connecting the front ends of the ground speed vectors Vg and a circle of |Va| with the end-to-end length of the ground speed vectors Vg as its radius is mathematically obtained as shown in FIG. 3B. This point c is the center of turn as seen from the atmosphere. An airspeed vector Va necessary for use at this time may be an estimated value or a measured value resulting from using an air data sensor capable of measuring the airspeed vector Va of air.

In this case, there are two computed centers c of the circle and it is difficult to determine whether or not the center of the circle results from the actual turn only from data on the two ground speed vectors. Therefore, the centers of the circle estimated from data on several ground speed vectors are subjected to statistical processing; specifically, what shows less dispersion of estimated results of a plurality of centers of the circle is used as an actual center of the circle. Consequently, acquisition of a plurality of data points by making the airframe 1 have at least a half-turn is preferred.

The estimated center of the circle has the wind vector Vw as shown in FIG. 4 and the wind estimation can be made by estimating the center of the turning circle.

Figure 5:
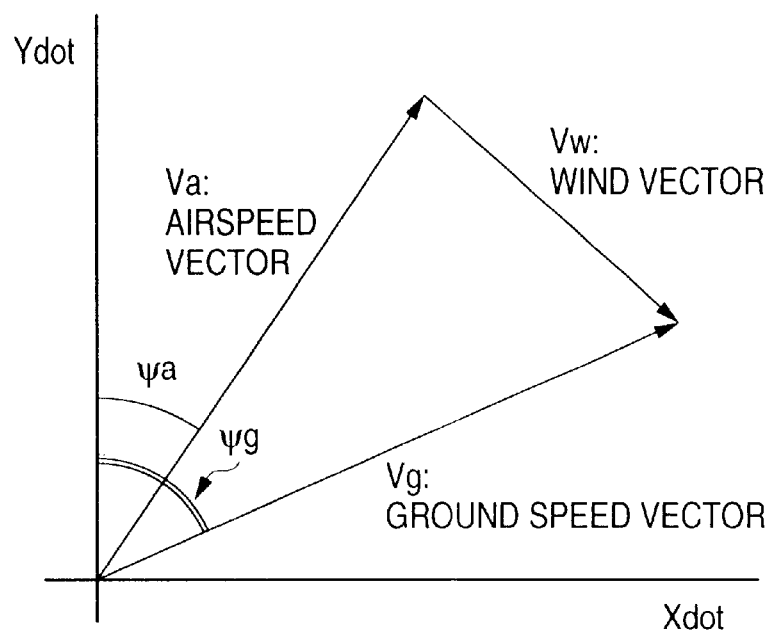
FIG. 5 is a diagram illustrating another wind estimating method.

FIG. 5 shows a wind estimating method 2 by means of the DGPS and magnetic direction sensor 13 as another example which will be described below.

While the airframe 1 is making a linear flight, the ground speed vectors Vg are then obtained on the basis of information from the GPS receiver 11, the DGPS beacon receiver 12, the DGPS base station 21 or GPS receiver 11 alone. Further, the azimuth of the airframe 1 estimated by the magnetic direction sensor 13, that is, a wind vector Vw is estimated from the traveling direction and roughly calculated by the following equation. An estimated value may be used for the airspeed vector Va that is needed at this time or otherwise a measured value using the air data sensor capable of measuring the airspeed vector Va of the air may also be used then.

$\dot{X}w = Vg \cdot \sin(\psi g) + Va \cdot \sin(\psi a)$ $\dot{Y}w = Vg \cdot \cos(\psi g) + Va \cdot \cos(\psi a)$ $Vw = \dot{X}w^2 + \dot{Y}w^2$ $\psi w = \tan^{-1}(\dot{X}w/\dot{Y}w)$ $\psi g$: airspeed direction Va: airspeed vector Vg: ground speed vector Vw: wind velocity $\dot{X}w$: component X of ground speed $\dot{Y}w$: component Y of ground speed      [Numerical Formula 1]

(Consideration of the Wind Effect)

As the lift-drag ratio L/D of the airframe 1 is basically constant, the airspeed vector Va is also constant in the quasi-equilibrium gliding condition and regardless of presence or absence of wind, the forward speed and the descent velocity relative to the air will not vary greatly. This guidance law is not intended to guide the airframe 1 on the coordinates relative to the ground but to guide the airframe 1 on the coordinates relative to moving air, whereby greater accuracy of descent can be attained with the same guidance law under any condition ranging from no-wind to moderate gale exceeding the forward airspeed of the airframe 1.

Figure 6:
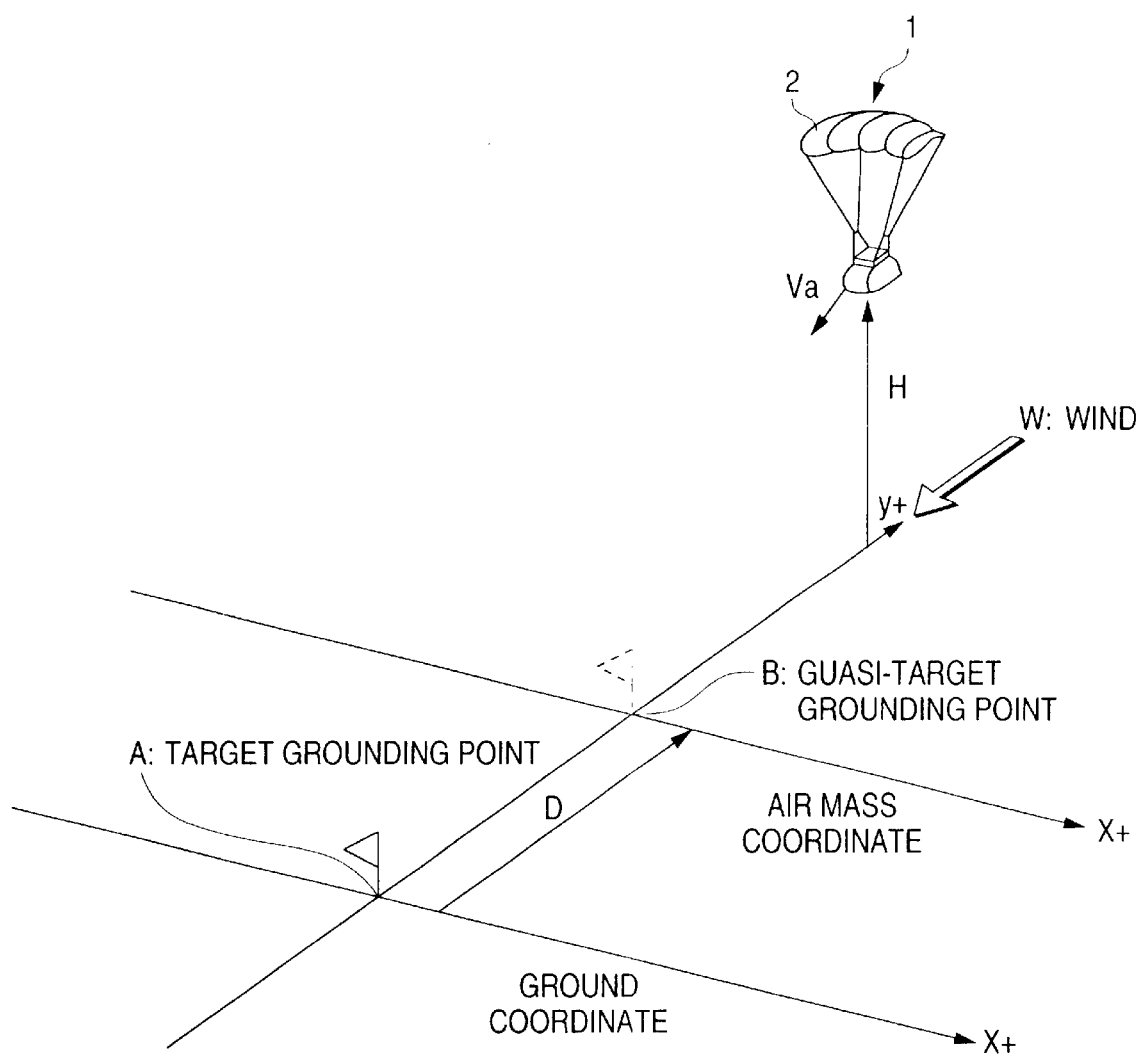
FIG. 6 is a diagram illustrating effect of wind.

A quasi-target grounding point that is important in the coordinates relative to the ground will be described by reference to FIG. 6. The air mass and ground coordinates of guidance are set so that the +direction of the Y-axis may directly face the wind. While the ground coordinates are such that a target grounding point A is fixed to the origin thereof, the air mass coordinates move to the leeward (one direction) on the Y-axis of the ground coordinates with the quasi-target grounding point B always moved by the present altitude and wind velocity as an origin. Although the quasi-target grounding point B is always offset to the windward of the actual target grounding point A, this is due to taking into consideration the movement of the atmosphere, that is, the wind effect beforehand.

Even under any condition that the wind velocity exceeds the forward airspeed of the airframe 1, the airframe 1 flying and landing backward can be prevented from being carried leeward from the target grounding point A and failing to return thereto. The relation of the quasi-target grounding point B to the ground coordinates, that is, the distance D is expressed by the following equation.

$$\dot{H} = Va/\sqrt{1+(L/D)^2}$$

$$\Delta T = H/\dot{H}$$

$$D = \Delta T \cdot Wsp \quad \text{[numerical formula 2]}$$

D: distance between quasi-target grounding point and target grounding point $\Delta T$: time required for airframe to land from the present altitude up to landing $\dot{H}$: present altitude H: descent velocity (that is assumed to be constant)

(L/D): lift-drag ratio

Va: airspeed

Wsp: wind velocity

Consequently, the distance D decreases as the altitude H lowers and when the altitude H becomes zero, that is, at the point of time the airframe 1 lands, the quasi-target grounding point B coincides with the actual target. Therefore, the airframe 1 can be guided theoretically without being affected by the wind by guiding the airframe 1 to the quasi-target grounding point B as the origin of the ground coordinates at all times.

(Altitude Adjustment)

Altitude adjustment is important in view of securing greater accuracy of descent of the airframe 1. However, the point is how to process the altitude near the target grounding point A with efficiency and there are a continuous and a race track turn method, for example, for the altitude processing.

Figure 7:
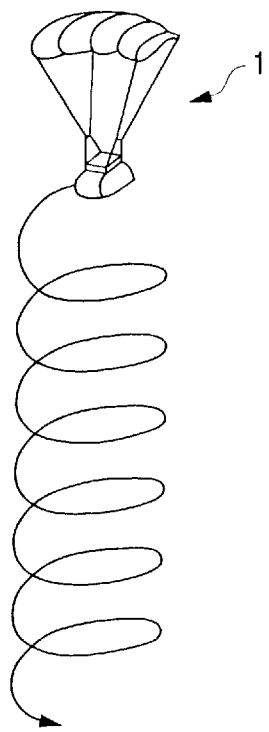
FIG. 7 is a diagram illustrating an altitude adjusting method.

This continuous turn is the most efficient method of processing the altitude that makes the most of the characteristics of the parafoil having a smaller turning radius than that of the flight vehicle. As shown in FIG. 7, the altitude may be processed on a substantially fixed point by continuously turning the airframe 1 in the no-wind condition.

The airframe 1 is turned by tugging the left or right control line 5a or 5b using the actuator 18a or 18b during the time expected to be necessary for its turn.

Figure 8:
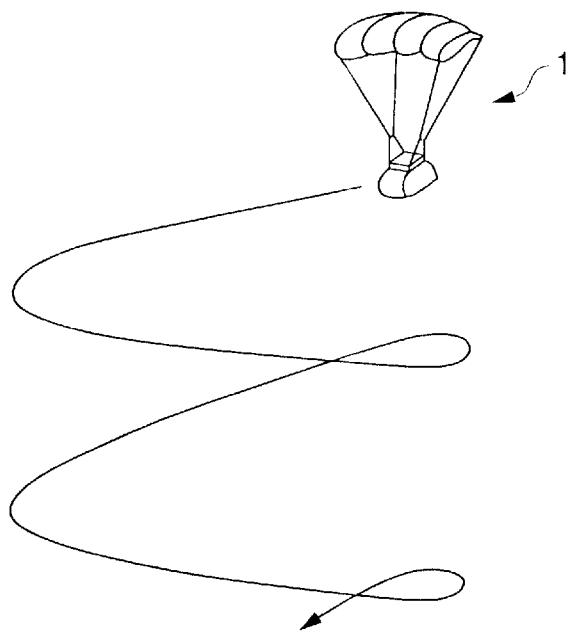
FIG. 8 is a diagram illustrating another altitude adjusting method.

The race track turn will subsequently be described. When the airframe 1 is continuously turned while the wind exists under a certain condition, the turning airframe 1 is carried leeward at the same velocity as the wind velocity. While the airframe 1 is being continuously turned as shown in FIG. 8, the airframe 1 is periodically moved windward whereby to prevent the airframe 1 from unnecessarily departing from the target grounding point A according to this altitude processing method.

An example of the guidance law incorporating the wind estimation, consideration of the wind effect and the factors of altitude adjustment will subsequently be described with reference to FIG. 9 and FIG. 10 that shows the operation of the airframe 1 according to a flowchart.

The guidance law is constituted of five phases including wind estimation in phase 1; switching over to a nominal path, that is, a landing flight path in phase 2; altitude adjustment in phase 3; a final approach in phase 4; and a final flare in phase 5. Each phase together with the operation of the airframe will now be described.

After the parafoil 2 is opened at Step S1, wind velocity and wind direction are estimated at Step S2 in the phase 1; in other words, the initial value of the wind is estimated on the basis of the state quantity of the airframe obtained through the wind estimating method 1 using the DGPS or GPS alone by steadily turning the airframe 1 or the wind estimating method 2 using the DGPS and the magnetic direction sensor 13 by linearly traveling the airframe 1. The wind estimation is not limited to only the phase 1 but made in any other phase whenever the airframe 1 is steadily turned or linearly traveled so as to use the newest estimated value at all times. Then the landing flight path is determined by the flight computer 16 at Step S3 to determining the flight path according to the wind estimation.

Subsequently at Step S4 to flight path guidance in the phase 2, the airframe 1 is moved along the path running in the same direction as the wind direction on the air coordinates. At this time, the airframe 1 travels in a direction perpendicular to the Y-axis of the air coordinates.

At a point of time the airframe 1 arrives at the landing flight path or a position close to the landing flight path at Step S5 to changing the attitude, the airframe 1 is turned by tugging the right or left control line 5a or 5b during the time expected to be required for turning based on the turning performance thereof, and the airframe 1 travels on the landing flight path toward the leeward.

In the no-wind condition, the airframe 1 travels along the landing flight path on the assumption that it has already arrived at the landing flight path. At Step S6, the altitude adjustment in the phase 3 is made at the point of time the airframe 1 reaches the leeward from the quasi-target point B on the air coordinates. The landing flight path passes through the target grounding point A and is set at a near position parallel to a wind axis running in the same direction as the wind direction. The airframe 1 is prevented from being unnecessarily brought to the leeward by moving quickly onto the landing flight path.

At altitude adjustment Step S6, the airframe 1 enters the phase 3, that is, the continuous and race track turns when it is assumed necessary from the relation of the present position and the target grounding point A whereby to process the altitude, and descends while floating on the wind at path flight Step S7. The altitude adjustment is basically made by the continuous turn. However, when the wind exists, the race track turn is made periodically as the airframe 1 floats leeward from the target and by making the airframe 1 travel windward, whereby the airframe 1 is prevented from unnecessarily departing from the target.

The altitude adjustment in the phase 3 is intended to minimize the ground speed at the time of landing and ease the impact given to the payload and the final approach is made to direct the airframe 1 to the windward. As the lift-drag ratio (L/D) is constant, the flight path toward the target exists only one path, so that the relation of the flight path of the final approach to the present position of the airframe 1 is as shown in FIG. 9.

Figure 9:
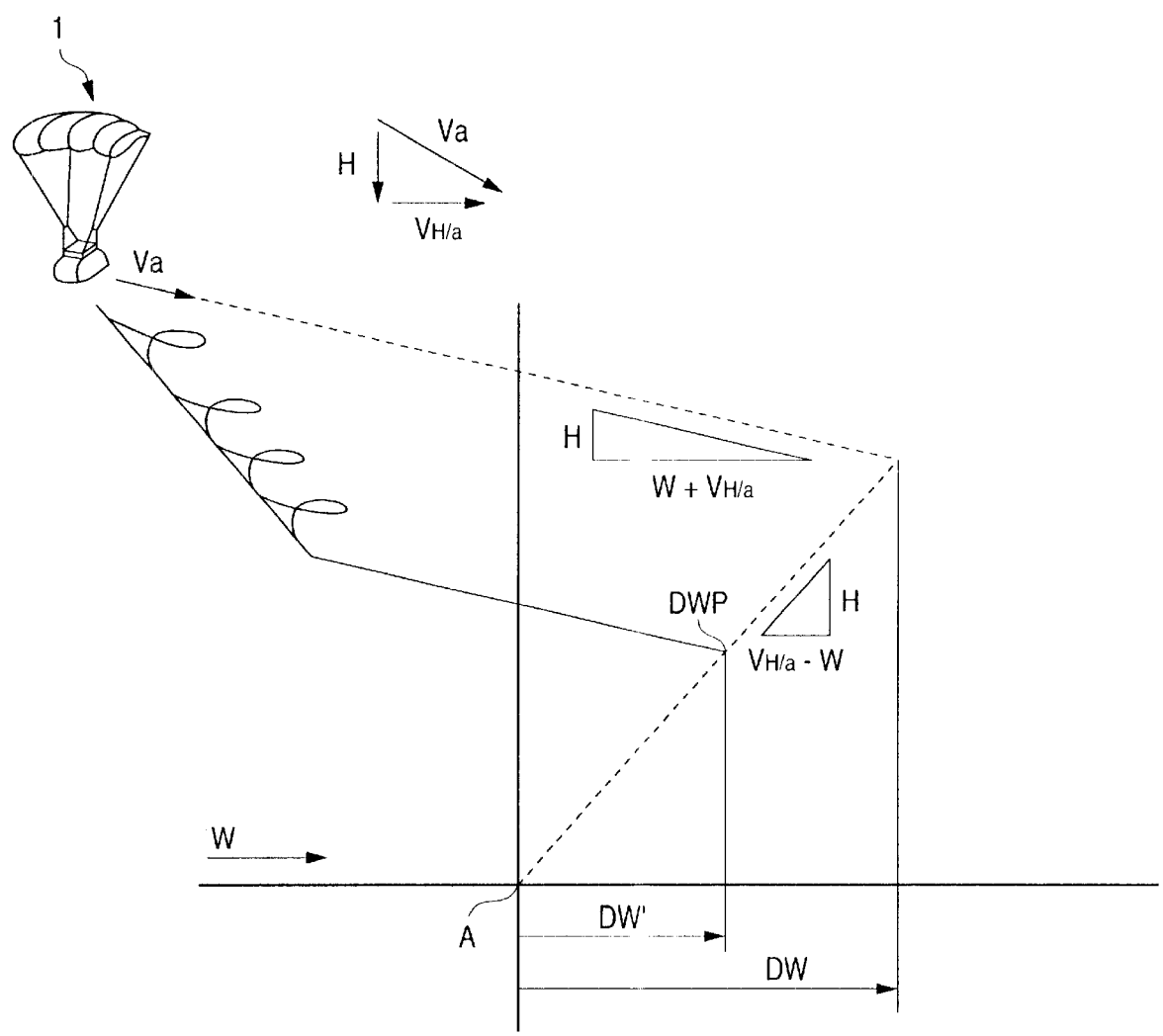
FIG. 9 is a diagram illustrating a flight vehicle guidance law.
Figure 10:
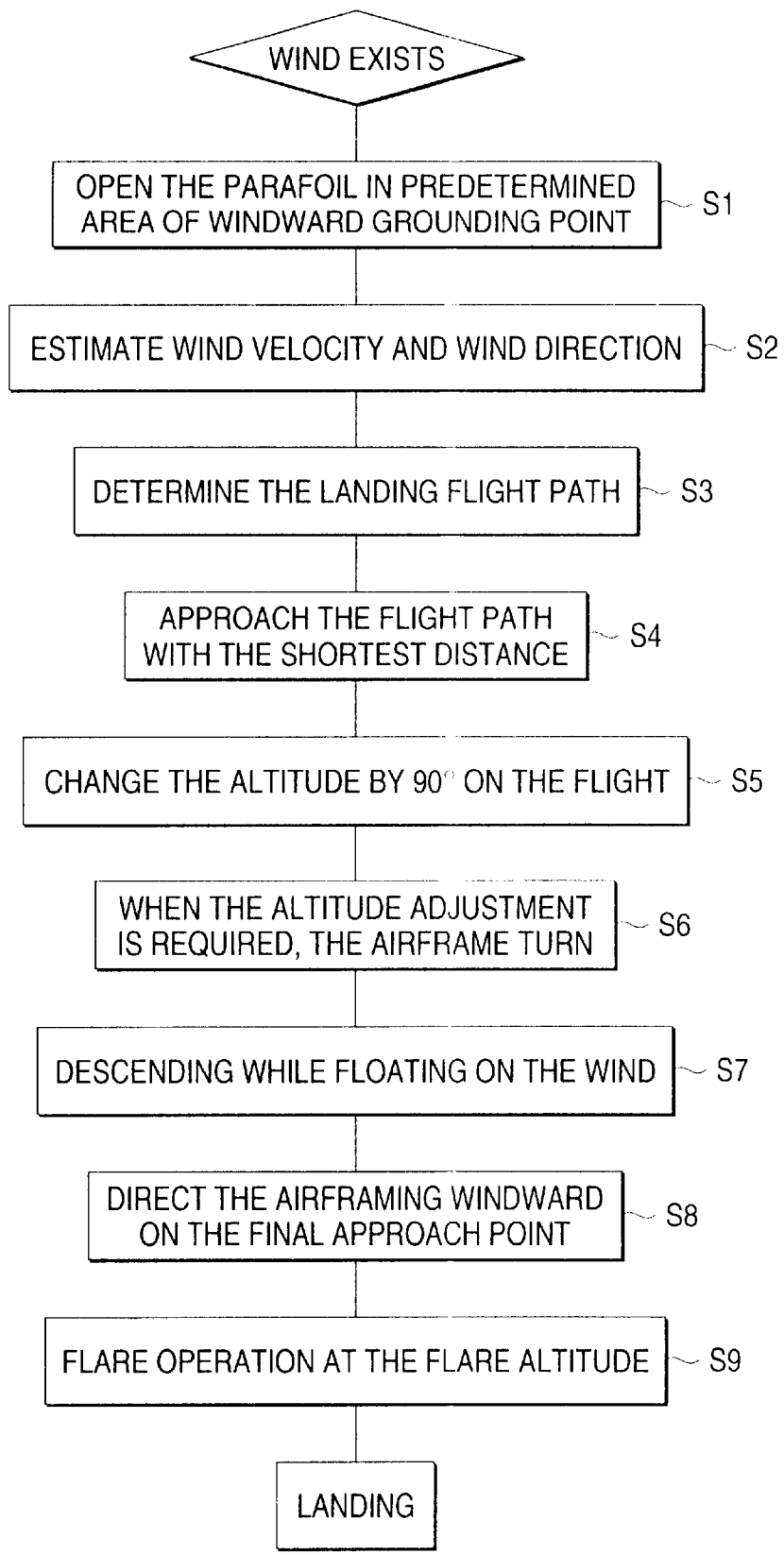
FIG. 10 is a flowchart illustrating the operation of the flight vehicle.

In other words, it is not advisable for the airframe 1 to unnecessarily travel away from the target, although the airframe 1 is allowed to reach the target along the path shown by a dotted line of FIG. 9. Therefore, the start point DWP of the final approach of FIG. 9 is set close to the target by making the altitude adjustment so as to reduce the unnecessary movement of the airframe 1 to the leeward. Consequently, the flight path after the altitude adjustment is as shown by a solid line of FIG. 9. The flight change Step S8 in the phase 4 is followed in a stage where the start point DWP of the final approach becomes equal to a preset threshold or lower.

In the phase 4, the final approach is made by directing the airframe 1 windward in order to minimize the ground speed at the time of landing and reduce the impact given to the payload. The airframe 1 that has been traveling leeward prior to the phase 4 is caused to face the wind by 180° turning the airframe 1 and made to travel toward the target while correcting an azimuth error and a path angle error with respect to the target grounding point.

At landing Step S9 in the phase 5, an altimeter such as a radio altimeter is used to measure the relative distance between the airframe 1 and a ground plane and when the measured value comes to the threshold or lower, the airframe 1 is reduced in speed and made to soft-land by subjecting the airframe 1 to full flare, that is, tugging the control lines 5a and 5b by the same length.

Thus, the payload is fixed to the payload carrying frame 3 prior to flight, loaded in the aircraft and dropped at the drop point set to ensure that the target grounding point is reached from the present position in consideration of the wind velocity and wind direction in the sky. The parafoil 2 opened by wind pressure in the air suspends the payload and is guided by the navigation guidance control unit 10 toward the target grounding point while gliding in a substantially balanced attitude; specifically, the airframe 1 is turned by tugging one of the left and right control lines 5a and 5b using the actuators 18a and 18b and landed at the target grounding point A accurately by changing the azimuth of the airframe in a desired direction or simultaneously tugging both the control lines 5a and 5b.

Figure 11:
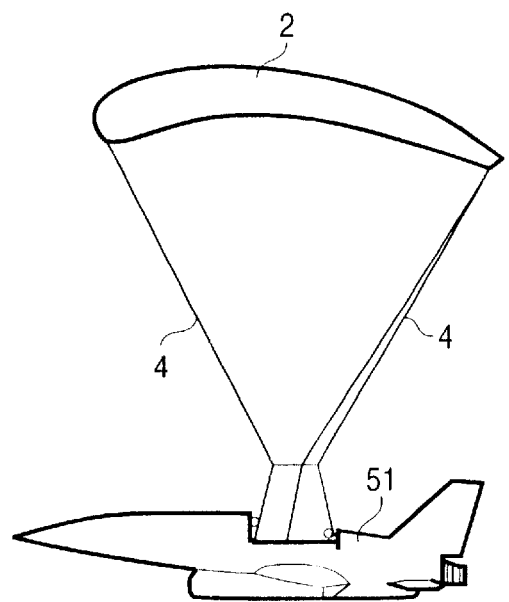
FIG. 11 is a diagram illustrating another flight vehicle.
Figure 12:
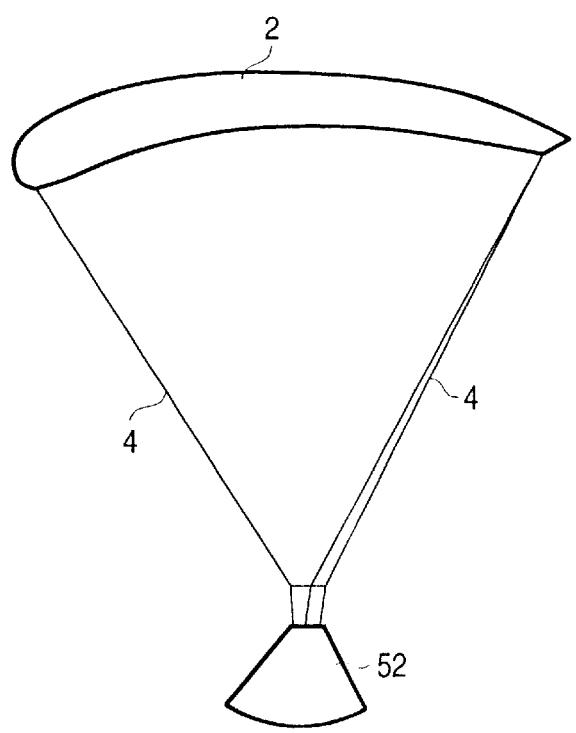
FIG. 12 is a diagram illustrating still another flight vehicle.

Moreover, the present invention can be implemented by suspending from the parafoil 2 an unmanned aircraft 51 as shown in FIG. 11 or a spacecraft 52 as shown in FIG. 12 in place of the payload carrying frame 3. Although a special navigation guidance control unit 10 can be loaded in that case, equipment mounted in the unmanned aircraft 51 or the spacecraft 52 is also usable.

It may also be arranged that the unmanned aircraft 51 or the spacecraft 52 is made to travel toward a preset recovery area and on arriving at the recovery area after the termination of a predetermined flight or at the time of emergency, a parafoil-opening point is set so that the aircraft or spacecraft can reach the target recovery point based on the wind direction and velocity detected by an installed airspeed sensor. Then the unmanned aircraft or spacecraft can be guided and recovered in the same manner as what has been described in the aforementioned embodiment of the invention.

Figure 13:
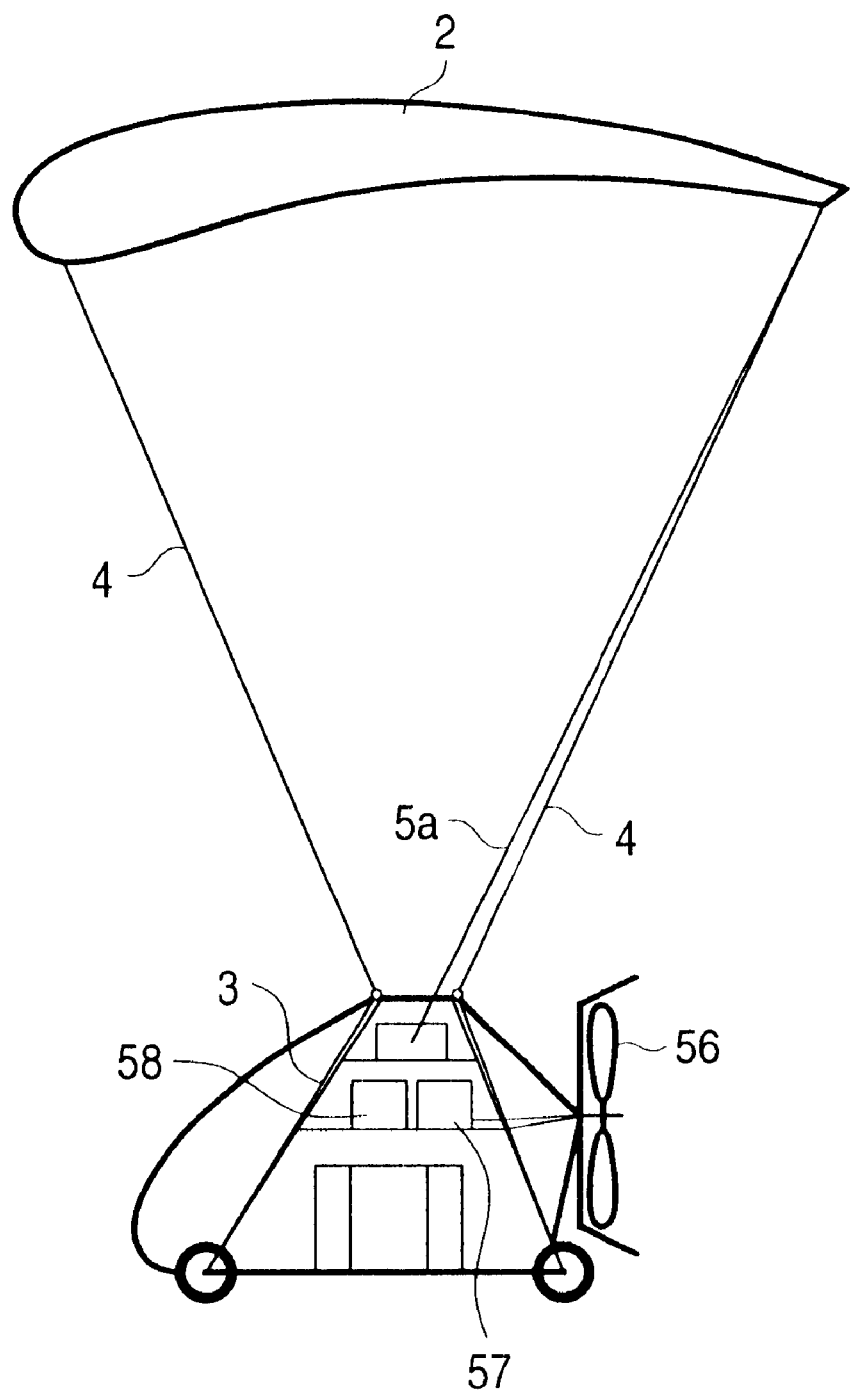
FIG. 13 is a diagram illustrating still an other flight vehicle.
Figure 14:
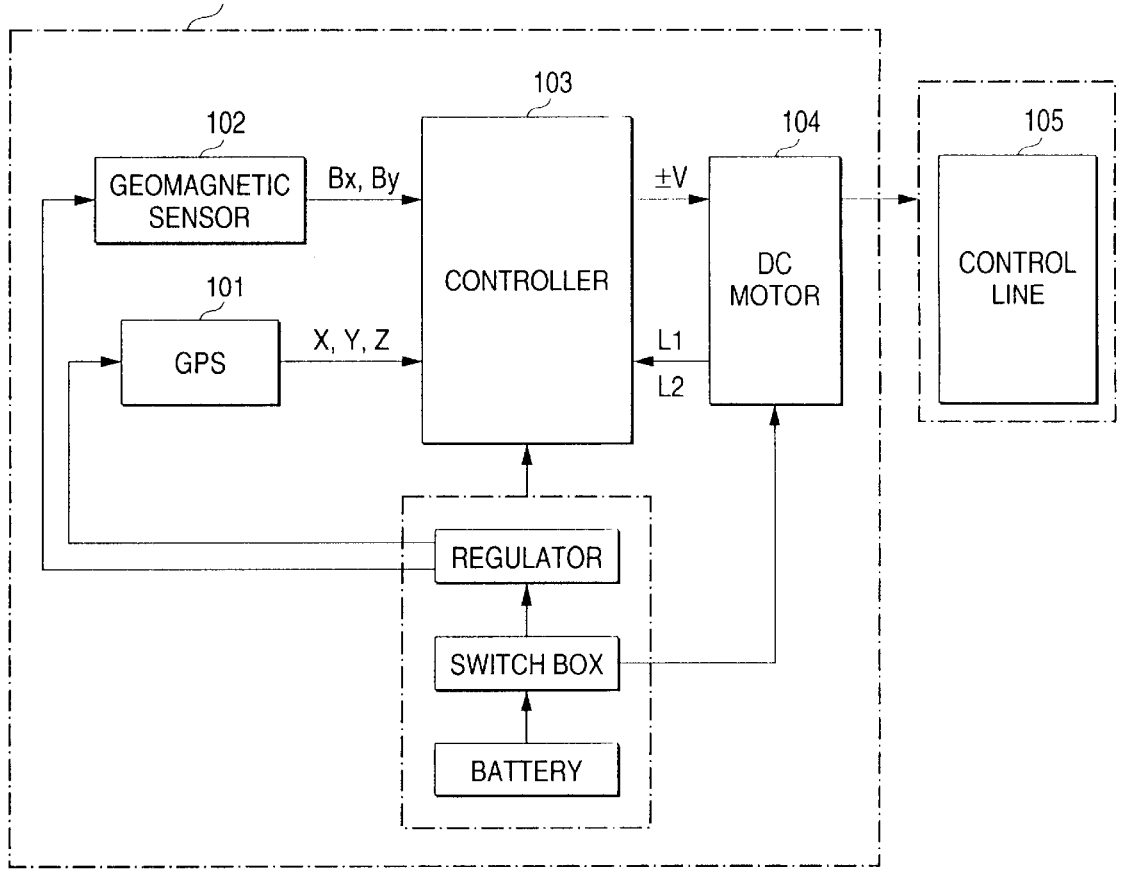
FIG. 14 is a block diagram illustrating a conventional guidance apparatus.
Figure 15:
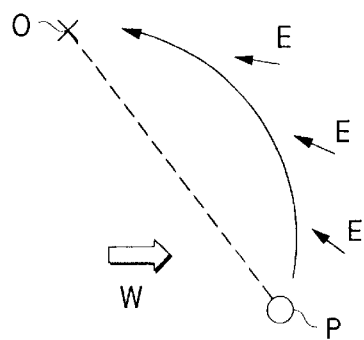
FIG. 15 is a diagram illustrating the flight path of a flight vehicle in the conventional guidance apparatus.

As shown in FIG. 13, further, the payload carrying frame 3 may be loaded with a payload 55 having an engine 57 with a propeller 56, a fuel tank 58 and the like. At the time of taking off, the airframe 1 rolls on the ground until the parafoil 2 obtains lift necessary for taking off from the thrust produced by the propeller 56 and after taking off, it cruises up to a target place like an ordinary aircraft. The traveling direction of the airframe 1 is controlled by properly tugging the left and right control lines 5a and 5b using the actuators and the airframe 1 is guided to a target grounding point through the operation described in the above embodiment of the invention after arrival at the target place.

While only certain embodiments of the invention have been specifically described herein, it will apparent that numerous modification may be made thereto without departing from the spirit and scope of the invention.

As described the above, according to the first aspect of the invention, there is provided an automatic guidance system for guiding a flight vehicle having a parafoil to a target grounding point, comprising the steps of: opening the parafoil of the flight vehicle dropped in a predetermined area above a grounding target point; estimating wind velocity and wind direction after the parafoil of the flight vehicle is opened; determining the landing flight path of the flight vehicle based on the estimated wind velocity and wind direction; guiding the flight of the flight vehicle to the determined landing flight path; and making the flight vehicle descend according to the landing flight path.

In the invention of the first aspect, the wind velocity and wind direction are estimated after the parafoil of the flight vehicle dropped in the predetermined area above the grounding target point is opened and the landing flight path of the flight vehicle is determined based on the estimated wind velocity and wind direction. Then the flight vehicle is made to descend along the determined landing flight path and accordingly an optimum landing flight path corresponding to the estimated wind velocity and wind direction is secured, whereby greater accuracy of descent can be attained.

According to the second aspect of the invention, there is provided an automatic guidance system for a flight vehicle having a parafoil to a target grounding point comprises the steps of: opening the parafoil of the flight vehicle dropped in a predetermined area on the windward of and above a grounding target point; estimating wind velocity and wind direction after the parafoil of the flight vehicle is opened: determining a landing flight path according to which the flight vehicle descends from the windward to the leeward based on the estimated wind velocity and wind direction; guiding the flight of the flight vehicle to a position close to the determined landing flight path; changing the attitude of the flight vehicle so as to direct the flight vehicle to the leeward in the position close to the landing flight path; adjusting the altitude of the flight vehicle; making the flight vehicle with its altitude adjusted descend from the windward to the leeward according to the landing flight path; and making the flight vehicle land by changing the attitude of the flight vehicle so as to direct the flight vehicle windward on the leeward of the target grounding point.

In the second aspect of the invention, which has materialized the first aspect of the invention, the step of adjusting the altitude of the flight vehicle is provided in addition to the first aspect of the invention. Accordingly, the flight vehicle is prevented from excessively floating leeward. Moreover, the flight vehicle is made to land by changing the attitude of the flight vehicle so as to direct the flight vehicle windward on the leeward of the target grounding point, whereby a landing impact is eased because the landing speed is suppressed.

According to the third aspect of the invention, in the automatic guidance system in the first aspect or the second aspect of the invention, the estimation of the wind velocity and wind direction is calculated by the ground speed of the flight vehicle obtained by GPS or DGPS.

In the third aspect of the invention, the wind velocity and wind direction are efficiently estimated by the ground speed of the flight vehicle obtained by GPS or DGPS.

According to the fourth aspect of the invention, in the automatic guidance system in the first aspect or the second aspect of the invention, the estimation of the wind velocity and wind direction is calculated by the ground speed of the flight vehicle, and the azimuth and airspeed of the flight vehicle obtained by GPS or DGPS.

In the fourth aspect of the invention, the wind velocity and wind direction are efficiently estimated by the ground speed of the flight vehicle and the azimuth and airspeed of the flight vehicle obtained by GPS or DGPS.

According to the fifth aspect of the invention, in the automatic guidance system in the second aspect of the invention, the altitude adjustment of the flight vehicle is made by a continuous turn of the flight vehicle.

In the fifth aspect of the invention, the altitude adjustment of the flight vehicle is easily made by a continuous turn of the flight vehicle effectively utilizing the characteristics of the parafoil.

According to the sixth aspect of the invention, there is provided a navigation guidance apparatus for a flight vehicle having a parafoil is such that the apparatus for guiding the flight vehicle having the parafoil to a target grounding point comprises wind-velocity and wind-direction estimating means for estimating wind velocity and wind direction after the parafoil of the flight vehicle is opened; land flight path determining means for determining the landing flight path of the flight vehicle based on the wind velocity and wind direction estimated by the wind-velocity and wind-direction estimating means; and flight control means for controlling the parafoil so that the flight vehicle descends according to a landing flight path determined by the flight path determining means.

In the sixth aspect of the invention, the provision of the wind-velocity and wind-direction estimating means for estimating wind velocity and wind direction, land flight path determining means for determining the landing flight path of the flight vehicle based on the wind velocity and wind direction, and flight control means for controlling the parafoil so that the flight vehicle descends according to the landing flight path makes the automatic guidance system of the first aspect to the fifith aspect of the invention attainable with efficiency.

According to the seventh aspect of the invention, in the navigation guidance apparatus in the sixth aspect, the wind-velocity and wind-direction estimating means includes a GPS receiver and a flight computer for estimating the wind velocity and wind direction based on ground speed vectors obtained by the GPS receiver.

In the seventh aspect of the invention, the flight computer is used to estimate the wind velocity and wind direction based on the ground speed vectors obtained by the GPS receiver as the flight vehicle travels.

According to the eighth aspect of the invention, in the navigation guidance apparatus in the sixth aspect of the invention, the wind-velocity and wind-direction estimating means includes a GPS receiver, a magnetic direction sensor for detecting the azimuth of the flight vehicle, and a flight computer for estimating the wind velocity and wind direction based on ground speed vectors obtained by the GPS receiver, the azimuth of the flight vehicle and the airspeed of the flight vehicle obtained by the magnetic direction sensor.

In the invention of the eight aspect of the invention, the flight computer is used to estimate the wind velocity and wind direction based on the ground speed vectors obtained by the GPS receiver, the azimuth of the flight vehicle and the airspeed of the flight vehicle obtained by the magnetic direction sensor.

According to the ninth aspect of the invention, in the navigation guidance apparatus as in either the seventh aspect or eighth aspect of the invention, the apparatus uses a DGPS beacon receiver in addition to the GPS receiver.

In the invention of the ninth aspect of the invention, the use of the DGPS beacon receiver in addition to the GPS receiver makes available the ground speed vectors with accuracy and also allows the wind velocity and wind direction to be estimated with accuracy.

According to the tenth aspect of the invention, in the navigation guidance apparatus as in one of the seventh aspect to the ninth aspect of the invention, the flight path determining means is the flight computer for determining the flight path based on the wind velocity and the force of the wind that have been estimated and wherein the flight control means are actuators for tugging the control lines of the parafoil under the control of the flight computer.

In the tenth aspect of the invention, the flight path determining means is constituted of the flight computer and the flight control means are constituted of the flight computer and actuators for tugging the control lines of the parafoil.

What is claimed is:

1. An automatic guidance system for guiding a flight vehicle having a parafoil to a target grounding point, comprising the steps of:
   opening the parafoil of said flight vehicle dropped in a predetermined area above a target grounding point;
   estimating wind velocity and wind direction after the parafoil of said flight vehicle is opened;
   determining a landing flight path of said flight vehicle based on said estimated wind velocity and wind direction;
   guiding the flight of said flight vehicle to a position close to said determined landing flight path; and
   descending said flight vehicle according to said landing flight path.

2. An automatic guidance system according to claim 1, wherein, when the parafoil of said flight vehicle is dropped in a predetermined area on the windward of and above the target grounding point, said determining step determines the landing flight path so that said flight vehicle descends from the windward to the leeward, and said descending step descends from the windward to the leeward according to the said landing flight path.

3. An automatic guidance system according to claim 2, further comprising the step of:
   changing an attitude of said flight vehicle so as to direct said flight vehicle to the leeward in the position close to said landing flight path.

4. An automatic guidance system according to claim 2, wherein said guiding step guides the flight of the flight vehicle in a direction perpendicular to the estimated wind direction.

5. An automatic guidance system according to claim 2, further comprising the step of:
   landing said flight vehicle by changing the attitude of said flight vehicle so as to direct said flight vehicle windward on the leeward of said target grounding point.

6. An automatic guidance system according to claim 4, further comprising the step of:
   adjusting the altitude of said flight vehicle before said descending step.

7. An automatic guidance system according to claim 6, wherein, in said adjusting step, said altitude adjustment of said flight vehicle is performed by a continuous turn of said flight vehicle.

8. An automatic guidance system according to claim 6, wherein, in said adjusting step, said altitude adjustment of said flight vehicle is performed by a race track turn of said flight vehicle.

9. An automatic guidance system according to claim 1, wherein, in said estimating step, said estimation of said wind velocity and wind direction is calculated by the ground speed of said flight vehicle obtained by GPS or DGPS.

10. An automatic guidance system according to claim 1, wherein, in said estimating step, said estimation of said wind velocity and wind direction is calculated by the ground speed of said flight vehicle obtained by GPS or DGPS, the azimuth of said flight vehicle and the airspeed of said flight vehicle.

11. A navigation guidance apparatus for guiding a flight vehicle having a parafoil to a target grounding point, comprising:
   a wind-velocity and wind-direction estimating unit estimating wind velocity and wind direction after the parafoil of said flight vehicle is opened;
   a land flight path determining unit determining a landing flight path of said flight vehicle based on the wind velocity and wind direction estimated by said wind-velocity and wind-direction estimating unit; and
   a flight control unit controlling said parafoil so that said flight vehicle descends according to the landing flight path determined by said flight path determining unit.

12. A navigation guidance apparatus according to claim 11, wherein said wind-velocity and wind-direction estimating unit includes:
   a GPS receiver; and
   a flight computer estimating the wind velocity and wind direction based on ground speed vectors obtained by said GPS receiver.

13. A navigation guidance apparatus according to claim 12, wherein said wind-velocity and wind-direction estimating unit further includes a DGPS beacon receiver.

14. A navigation guidance apparatus according to claim 12, wherein said flight path determining unit is the flight computer determining the flight path based on the estimated wind velocity and wind direction, and
   wherein said flight control unit is an actuator for tugging control lines of said parafoil under the control of said flight computer.

15. A navigation guidance apparatus according to claim 11, wherein said wind-velocity and wind-direction estimating unit includes:
   a GPS receiver;
   a magnetic direction sensor detecting the azimuth of said flight vehicle; and
   a flight computer estimating the wind velocity and wind direction based on ground speed vectors obtained by said GPS receiver, the azimuth of said flight vehicle obtained by said magnetic direction sensor and the airspeed of said flight vehicle.

16. A navigation guidance apparatus according to claim 15, wherein said flight path determining unit is the flight computer determining the flight path based on the estimated wind velocity and wind direction, and
   wherein said flight control unit is an actuator for tugging control lines of said parafoil under the control of said flight computer.

17. A navigation guidance apparatus according to claim 11, wherein said wind-velocity and wind-direction estimating unit further includes a DGPS beacon receiver.

* * * * *

(12) EX PARTE REEXAMINATION CERTIFICATE (5574th)
United States Patent
Yoneda et al.

(10) Number: US 6,343,244 C1
(45) Certificate Issued: Oct. 17, 2006

(54) AUTOMATIC GUIDANCE SYSTEM FOR FLIGHT VEHICLE HAVING PARAFOIL AND NAVIGATION GUIDANCE APPARATUS FOR THE SYSTEM

(75) Inventors: Hiroshi Yoneda, Tokyo (JP); Atsushi Amito, Tokyo (JP)

(73) Assignee: Fuji Jukogyo Kabushiki Kaisha, Tokyo (JP)

Reexamination Request:
No. 90/007,380, Jan. 14, 2005

Reexamination Certificate for:
Patent No.: 6,343,244
Issued: Jan. 29, 2002
Appl. No.: 09/444,834
Filed: Nov. 22, 1999

(30) Foreign Application Priority Data

Nov. 24, 1998 (JP) .......................................... 10-332672

(51) Int. Cl.
*G06F 17/00* (2006.01)

(52) U.S. Cl. ............................. 701/3; 701/207; 701/213
(58) Field of Classification Search ....................... None
See application file for complete search history.

(56) References Cited

PUBLICATIONS

NASA Dryden Fact Sheet—Spacewedge; www.nasa.gov; Spacecraft Autoland Project; Oct. 1991 to Dec. 1996.*
Dassault Aviation, "Parafoil Technology Demonstration", *Executive Summary and Study Synthesis ENG–016, Aerazur APCO Ce–T DASA/RI, Dassault Aviation, DLR, Fokker Space OHB; Daimler–Benz Aerospace*, (Sep. 29, 1997).

NASA Technical Memorandum 4525, "The Development and Flight Test of a Deployable Precision Landing System for Spacecraft Recovery", *National Aeronautics and Space Administration* [*Alex G. Sim, James E. Myrray, David C. Neufeld; Nasa Dryden Flight Research Facility, Edwards CA,*] (Sep. 1993).

NASA Technical Memorandum 4599, "Further Development and Flight Test of an Autonomous Precision Landing System Using a Parafoil", *National Aeronautics and Space Administration* [*James E. Murray, Alex G. Sim, David C. Neufeld, Patrick K. Rennich, Stephen R. Norris, Wesley S. Hughes, Dryden Flight Research Center, Edwards CA*], (Jul. 1994).

\* cited by examiner

*Primary Examiner*—Michael J. Zanelli

(57) ABSTRACT

An automatic guidance system guides a flight vehicle having a para foil to a target grounding point. The system opens the para foil of the flight vehicle dropped in a predetermined area above the target grounding point. The system estimates wind velocity and wind direction after the para foil of the flight vehicle is opened. Then, the system determines the landing flight path of the flight vehicle based on the estimated wind velocity and wind direction, guides the flight of the flight vehicle to the determined landing flight path and descends the flight vehicle according to the landing flight path.

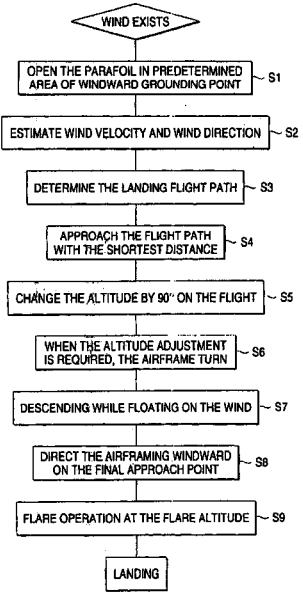

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–10 is confirmed.

Claim 11 is determined to be patentable as amended.

Claims 12–17, dependent on an amended claim, are determined to be patentable.

New claims 18–41 are added and determined to be patentable.

11. A navigation guidance apparatus for guiding a flight vehicle having a parafoil to a target grounding point, comprising:
  a wind-velocity and wind-direction estimating unit estimating wind velocity and wind direction after the parafoil of said flight vehicle is opened;
  a [land] *landing* flight path determining unit determining a landing flight path of said flight vehicle based on the wind velocity and wind direction estimated by said wind-velocity and wind-direction estimating unit;
  and a flight control unit controlling said parafoil so that said flight vehicle descends according to the landing flight path determined by said flight path determining unit.

18. *The automatic guidance system according to claim 1, wherein said flight vehicle is guided to the target grounding point by guiding said flight vehicle to a quasi-target grounding point,*
  *said quasi-target grounding point is offset to the windward of the target grounding point, and is determined by a present altitude and wind velocity.*

19. *The automatic guidance system according to claim 18, wherein*
  *said quasi-target grounding point has a specific relationship with said target grounding point,*
  *said relationship is defined as follows:*

$\dot{H} = Va / \sqrt{(1+(lift-dragratio)^2)}$ $\Delta T = H/\dot{H}$ $D = \Delta T \cdot Wsp$

*wherein*
  *D is distance between quasi-target grounding point and target grounding point,*
  *$\Delta T$ is time required for airframe to land from the present altitude up to landing,*
  *H is present altitude,*
  *$\dot{H}$ is descent velocity (that is assumed to be constant),*
  *Va: is airspeed, and*
  *Wsp: is wind velocity.*

20. *An automatic guidance system according to claim 1, wherein descending said flight vehicle according to said landing flight path includes guiding the flight vehicle on coordinates relative to moving air.*

21. *An automatic guidance system according to claim 1, wherein guiding the flight vehicle is governed by a guidance law constituted of five phases including: wind estimation in phase 1; switching over to a nominal landing flight path in phase 2; altitude adjustment in phase 3; a final approach in phase 4; and a final flare in phase 5.*

22. *An automatic guidance system according to claim 21, wherein said wind estimation phase is made in phase 1 and repeated in an additional phase.*

23. *An automatic guidance system according to claim 21, wherein a start point (DWP) for the final approach is determined and set leeward of the target grounding point, on an axis aligned with the estimated wind direction, and at an altitude which is set equal to a preset threshold or lower whereby there is reduced an unnecessary movement of the airframe to the leeward of the target grounding point.*

24. *An automatic guidance system according to claim 1, wherein determining the landing flight path of said flight vehicle based on said estimated wind velocity and wind direction includes establishing a quasi-target grounding point and a landing flight path descent pattern based on that quasi-target grounding point.*

25. *An automatic guidance system according to claim 24, wherein determining the flight path includes, upon the flight vehicle reaching a leeward side of the quasi target point and a windward side of the target grounding point, determining an altitude adjustment so as to establish a final descent leg initiation point on the leeward side of the target grounding point wherein the final descent leg extends along an axis parallel with the estimated wind direction determination and in a direction into the wind and minimizes the amount of leeward travel of the flight vehicle on the leeward side of the target grounding point.*

26. *An automatic guidance system according to claim 1, wherein the estimating of said wind velocity and wind direction involves at least a half turn determination of circle centers estimated from data on several ground speed vectors and provided vehicle air speed value, with the determined centers being subjected to statistical processing to determine a preferred circle center showing less dispersion amongst estimated results of determined circle centers, which preferred circle center is used as an actual circle center for real time determination of said estimated wind velocity and wind direction.*

27. *An automatic guidance system according to claim 1, wherein said flight vehicle is guided to the target grounding point by guiding said flight vehicle to a quasi-target grounding point, and wherein said quasi target point is calculated depending upon a present altitude.*

28. *An automatic guidance system according to claim 1, wherein said flight vehicle is guided to the target grounding point by guiding said flight vehicle to a quasi-target grounding point, and wherein said quasi-target point is calculated with estimated wind velocity taken into consideration.*

29. *A navigation guidance apparatus according to claim 11, wherein said flight control unit controls said parafoil so that said flight vehicle descends according to coordinates relative to moving air.*

30. *A navigation guidance apparatus according to claim 11, wherein said wind-velocity and wind-direction estimating unit and said landing flight path determining unit operate under a guidance law that is constituted of five*

*phases including wind estimation in phase 1; switching over to a nominal landing flight path in phase 2; altitude adjustment in phase 3; a final approach in phase 4; and a final flare in phase 5.*

31. A navigation guidance apparatus according to claim 30, wherein said wind-velocity and wind-direction estimating unit is operational in phase 1 and in an additional phase.

32. A navigation guidance apparatus according to claim 11, wherein said landing path determining unit sets a start point (DWP) for the final approach which is set leeward of the target grounding point, on an axis aligned with the estimated wind direction, and at an altitude which is set equal to a preset threshold or lower whereby there is reduced an unnecessary movement of the airframe along the landing flight path to the leeward of the target grounding point.

33. A navigation guidance apparatus according to claim 11, wherein said landing flight path determining unit establishes a quasi-target grounding point and landing flight path pattern based on that quasi-target grounding point.

34. A navigation guidance apparatus according to claim 33, wherein said landing flight path determining unit determines a flight path that includes, upon the flight vehicle reaching a leeward side of the quasi target point and windward side of the target grounding point, initiating an altitude adjustment so as to establish a final descent leg initiation point on the leeward side of the target grounding point wherein the final descent leg extends along an axis parallel with the estimated wind direction determination and in a direction into the wind and minimizes the amount of leeward travel of the flight vehicle to the leeward side of the target grounding point.

35. *A navigation guidance apparatus according to claim 11, wherein said wind-velocity and wind-direction estimating unit estimates said wind velocity and wind direction through review of at least a half turn determination of circle centers estimated from data on several ground speed vectors and a provided vehicle air speed value, with the determined centers being subjected to statistical processing to determine a preferred circle center showing less dispersion amongst estimated results of determined circle centers, which preferred circle that is used as an actual circle center for real time determination of said estimated wind velocity and wind direction.*

36. *A navigation guidance apparatus according to claim 11, wherein said landing flight path determining unit determines a landing flight path wherein said flight vehicle is guided to the target grounding point by guiding said flight vehicle to a quasi-target grounding point,*

*said quasi-target grounding point is offset to the windward of the target grounding point, and is determined based on present altitude and wind velocity values.*

37. *A navigation guidance apparatus according to claim 36, wherein*

*said quasi-target grounding point has a specific relationship with said target grounding point,*

*said relationship is defined as follows:*

$$\dot{H}=Va/\sqrt{(1+(lift-dragratio)^2)}$$

$$\Delta T=H/\dot{H}$$

$$D=\Delta T \cdot Wsp$$

*wherein*

*D is distance between quasi-target grounding point and target grounding point,*

*ΔT is time required for airframe to land from the present altitude up to landing,*

*H is present altitude,*

*$\dot{H}$ is descent velocity (that is assumed to be constant),*

*Va: is airspeed, and*

*Wsp: is wind velocity.*

38. *A navigation guidance apparatus according to claim 11, wherein said landing flight path determining unit determines a landing flight path wherein said flight vehicle is guided to the target grounding point by guiding said flight vehicle to a quasi-target grounding point, and wherein said quasi target point is updated based on different flight altitudes of the flight vehicle.*

39. *A navigation guidance apparatus according to claim 11, wherein said landing flight path determining unit determines a landing flight path wherein said flight vehicle is guided to the target grounding point by guiding said flight vehicle to a quasi-target grounding point, and wherein said quasi target point is calculated depending upon a present altitude.*

40. *A navigation guidance apparatus according to claim 11, wherein said landing flight path determining unit determines a landing flight path wherein said flight vehicle is guided to the target grounding point by guiding said flight vehicle to a quasi-target grounding point, and wherein said quasi-target point is calculated with estimated wind velocity taken into consideration.*

41. *A navigation guidance apparatus according to claim 1, wherein said flight vehicle is guided to the target grounding point by guiding said flight vehicle to a quasi-target grounding point, and wherein said quasi target point is updated based on different flight altitudes of the flight vehicle.*

\* \* \* \* \*